(No Model.) 3 Sheets—Sheet 1.
E. M. BENTLEY.
ELECTRIC CAR CONTROLLING DEVICE.
No. 444,479. Patented Jan. 13, 1891.
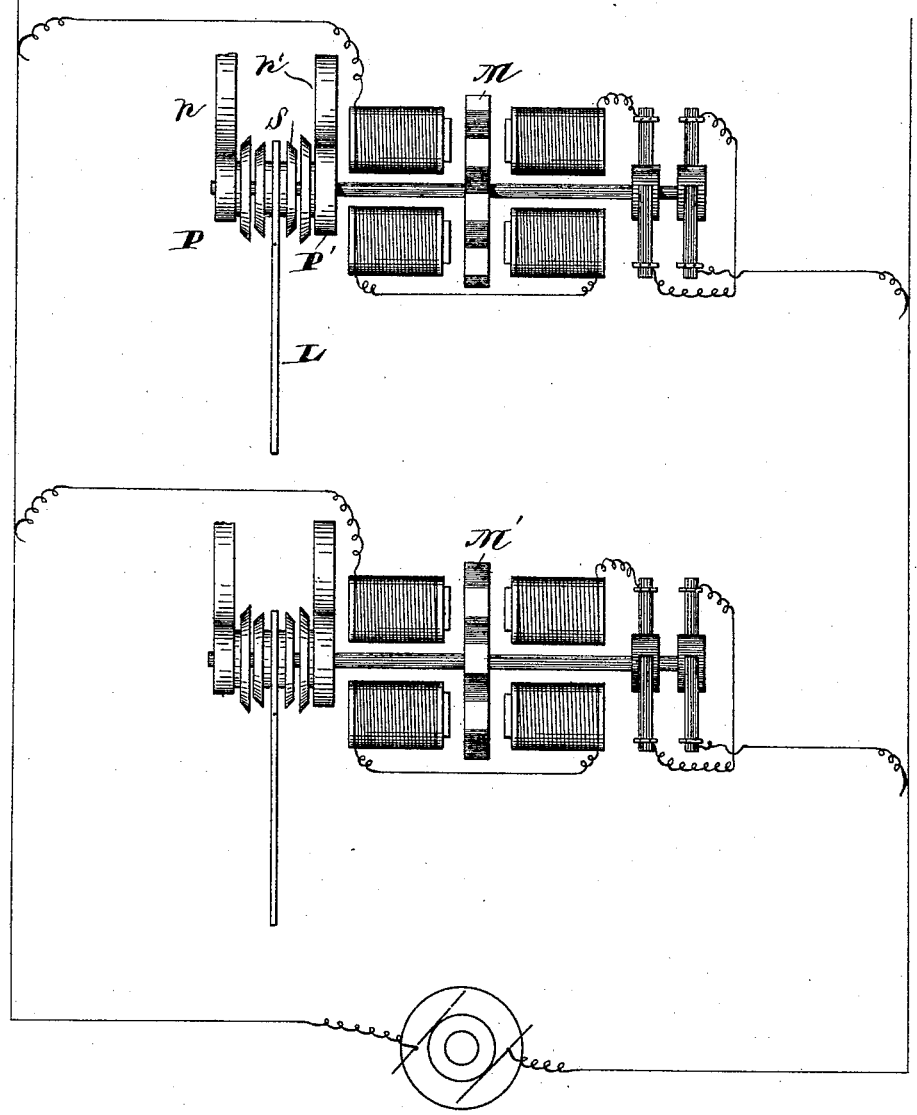

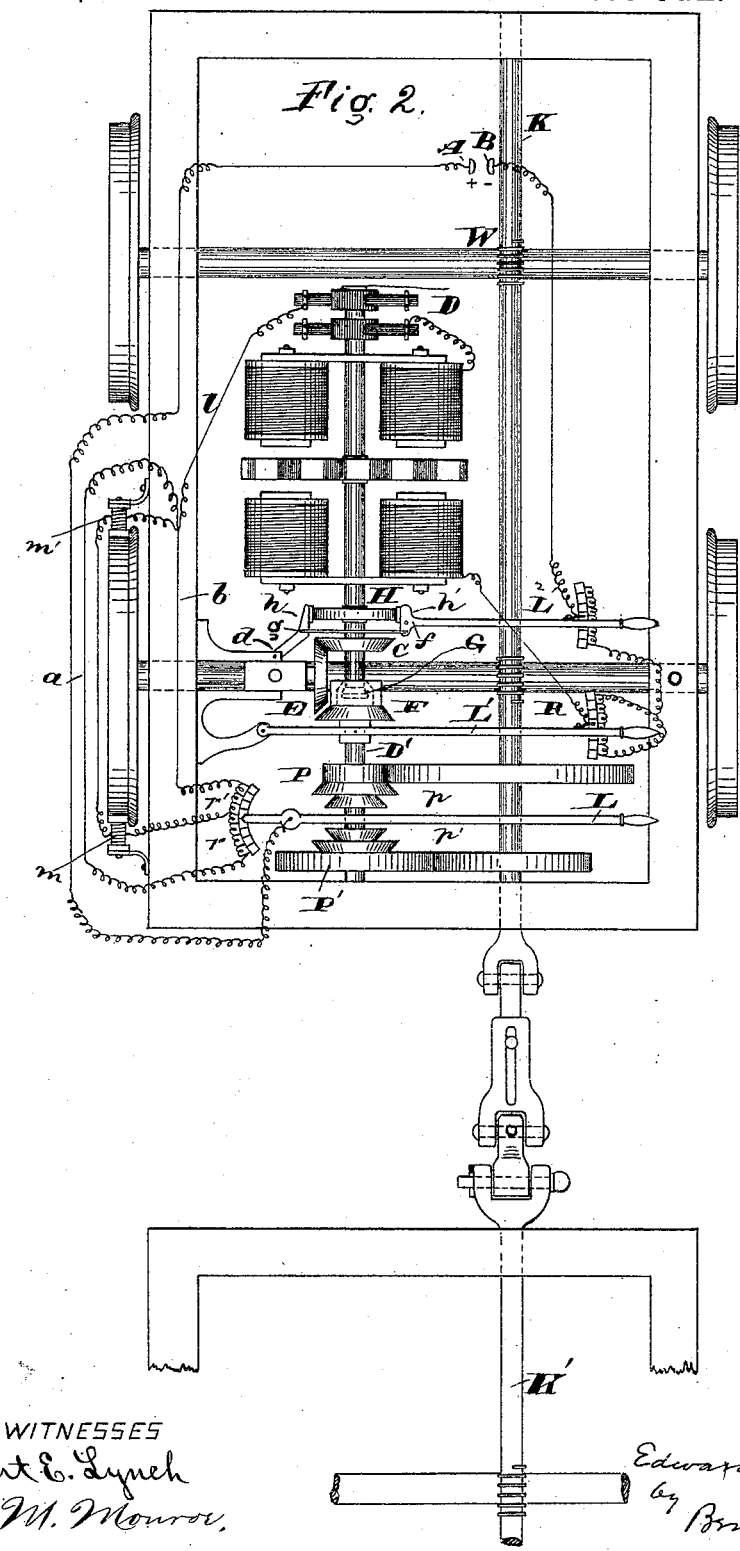

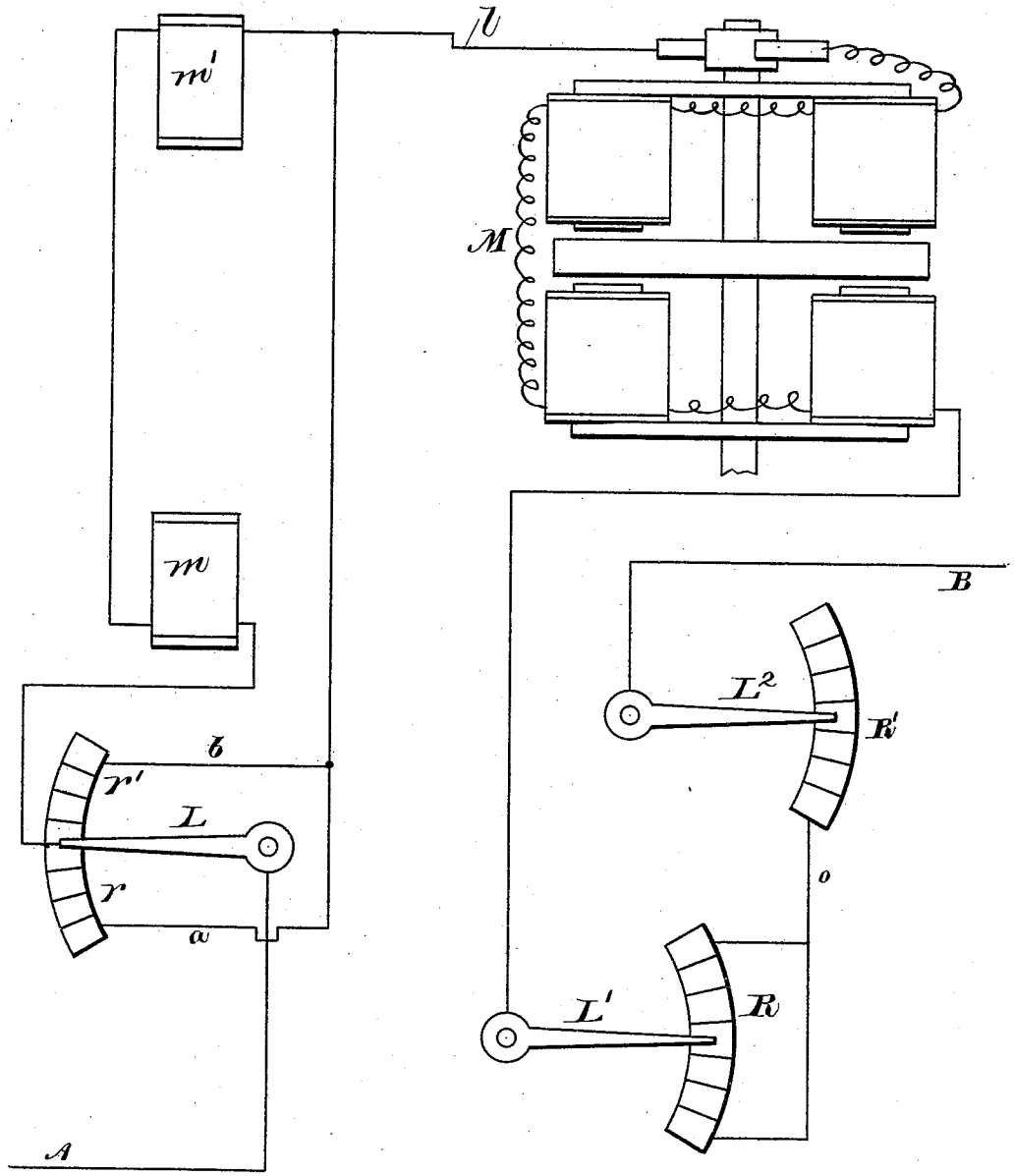

UNITED STATES PATENT OFFICE.

EDWARD M. BENTLEY, OF BROOKLYN, NEW YORK.

ELECTRIC-CAR-CONTROLLING DEVICE.

SPECIFICATION forming part of Letters Patent No. 444,479, dated January 13, 1891.

Application filed July 10, 1885. Serial No. 171,195. (No model.)

*To all whom it may concern:*

Be it known that I, EDWARD M. BENTLEY, a citizen of the United States, and a resident of Brooklyn, New York, have invented certain new and useful Improvements in Electric Railways, of which the following is a specification.

My invention relates to devices for operating electric motors so that they may be readily controlled and the speed of the driven mechanism varied, the said devices being especially applicable to motors used in propelling vehicles on an electric railway in multiple-arc.

The improvements claimed herein comprise a speed-changing mechanism, by which the ratio of speed between the armature and driven axles may be changed, and a regulator for the motor and brake for the car, which are controlled by the same operating-lever which brings the variable gear into and out of action. There is also illustrated herein a friction-clutch and reversing mechanism for changing the direction of movement of the car without reversing the motor, and certain other features relating to the regulation of the motor, which have been already described in Patent No. 424,699, granted to me April 1, 1890, and therefore no claim is now made to such features.

In the accompanying drawings, Figure 1 represents, diagrammatically, two electric motors M and M', each provided with brushes having a constant direction of lead, and a clutch for disconnecting each motor from its load and a device for changing its gear-connection with the load also. Fig. 2 represents in plan and in diagram an electric-motor truck equipped with my improvements; and Fig. 3 is a diagram showing the arrangement of circuits leading through the motor, brake-magnets, and regulating devices.

For connecting and disconnecting mechanically the motor with the vehicle, I employ the mechanism controlled by lever L'.

D is the motor-shaft, upon which is a beveled or friction gear-wheel C. This wheel C meshes with a similar wheel E, and E in one position of lever L' engages with a third wheeel F, which is on shaft D', so that for a given direction of rotation of D an opposite direction of rotation is imparted to D'. In the other position of lever L' wheel F, which has a sliding motion on D', is thrown out of engagement with E, and at the same time a friction-clutch G between D and D' is thrown into action, so that a given direction of rotation imparts the same direction of rotation to D'. The lever L' also controls a resistance R in the motor-circuit, so that when the lever is in its middle position the maximum resistance is inserted in the motor-circuit, and thus racing of the motor when freed from its load is prevented. Normally the motor is driven continuously in one direction, and the direction of progress of the vehicle is controlled by lever L', as above described, while the speed of the car is varied by a lever L, which operates a speed-changing gear, as hereinafter described. It may, however, be necessary at some time to stop both motor and vehicle, and for this purpose I provide a brake on the shaft of the motor, which is under the control of lever L². This brake consists of a brake-wheel H, fast upon the shaft D, which is engaged by brake-shoes $h\,h'$, pivoted at $d$ and $f$, respectively, and connected by a rod $g$, so that a single movement of the lever L² applies or removes both simultaneously from the brake-wheel H. The lever L² also controls a resistance in the motor-circuit, so that the current may be decreased at the same time that the brake is applied. Gear or friction wheels P P' upon the shaft D' engage corresponding wheels upon a counter-shaft K, and upon shaft K are screws W, which are geared to drive the axles of the car by any desired mechanism (not illustrated herein, as it constitutes no part of my invention.) The shaft K extends longitudinally along the vehicle and terminates in an extensible-joint connection with a similar shaft K' upon the following vehicle of the train. By means of this connection of the motor with the driving-wheels upon one or more cars of a train the power of the motor is transmitted through the train to the wheels thereof, and the adhesive force of all such cars is practically added to that of the locomotive for the purpose of giving an adhesion commensurate with the power of the motor. The variable-speed gears P P' are controlled by the lever L through the intervention of a clutch consisting of a sleeve S, splined or keyed to the motor-shaft, and carrying upon its two ends one member of a friction-clutch, which is adapted to engage a corresponding member fast to the gear-wheel in a manner well understood, and thus transmit the power of the motor to the axles through either set of gears, as may be desired. The lever L also controls a brake adapted to arrest the movement of the car whenever it is disconnected from the motor. This is shown for convenience as an electro-magnetic brake, and the circuit through it may be traced from the positive contact A to lever L, thence through brake-magnets $m$ $m'$, from whence it passes by lead $l$ to the motor, and so on back to the negative contact B.

In Fig. 2 the lever L is shown in its middle position, when both wheels P P' run free and the motor is disconnected from its load. When the lever is moved from this middle position in either direction, so as to throw into action one set of gears, it at the same time throws a resistance $r$ into the brake-magnet circuit, and finally closes a short circuit around the said magnet, so that the circuit will be from the positive contact A to the lever L, and thence by lead $a$ or $b$, according to the position of the lever, directly onto the motor, as before. When, however, the motor is running free, the circuit will divide between the connection leading through the brake-magnets and the other conducting-paths through resistances $r$ and $r'$, and thus will effect a considerable increase in the resistance of the motor-circuit. The resistances $r$ $r'$ serve also as a regulator for the motor, for, as indicated above, when the brakes are freed resistance is cut out of the motor-circuit and additional current allowed to flow therethrough.

In Fig. 3 the circuits are shown on an enlarged scale and can be readily traced. The positive contact A is connected directly with the lever L, while from the lever to the motor there are three distinct paths through which the current will divide according to the position occupied by L. The first is that shown where the major portion of the current will pass through the brake-magnets $m$ $m'$, and the other two are through the resistances $r$ $r'$ and leads $a$ $b$, each of which forms a shunt around the brake-magnets. After leaving the motor the circuit passes through lever L' and resistance R, lead $o$, resistance R', lever L², and thence to negative contact. The resistances R R' and levers L' L² serve the purpose already fully described in my patent No. 424,699, above referred to, and need not be explained at greater length.

What I claim as new, and desire to secure by Letters Patent, is—

1. In an electric locomotive, the combination of speed-changing mechanism, whereby the ratio of speed between the armature and wheels may be changed, a brake for the vehicle, and a common operating device for the brake and said mechanism.

2. The combination, in an electric locomotive, of an electric motor with speed-changing mechanism, whereby the ratio of speed between the armature and wheels of the car may be varied, a regulator for the motor, and a common operating device for the regulator and speed mechanism, as set forth.

In testimony whereof I sign this specification, in the presence of two witnesses, this 24th day of June, 1885.

EDWARD M. BENTLEY.

Witnesses:
ALBERT E. LYNCH,
CHAS. H. DORER.